US006762789B1

(12) United States Patent
Sogabe et al.

(10) Patent No.: US 6,762,789 B1
(45) Date of Patent: Jul. 13, 2004

(54) OMNIDIRECTIONAL VIDEO OUTPUT METHOD AND APPARATUS

(75) Inventors: Yasushi Sogabe, Nishinomiya (JP); Hiroshi Ishiguro, Osaka (JP); Shigeki Murata, Nara (JP); Kenichi Hayashi, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 641 days.

(21) Appl. No.: 09/763,243

(22) PCT Filed: Jun. 19, 2000

(86) PCT No.: PCT/JP00/04002

§ 371 (c)(1), (2), (4) Date: Feb. 20, 2001

(87) PCT Pub. No.: WO01/05154

PCT Pub. Date: Jan. 18, 2001

(30) Foreign Application Priority Data

Jun. 25, 1999 (JP) .......................................... 11-179106

(51) Int. Cl.[7] ............................. H04N 7/00; G06K 9/00
(52) U.S. Cl. .......................................... 348/36; 382/100
(58) Field of Search .............................. 348/36, 37, 39, 348/42, 51, 143; 382/100, 154

(56) References Cited

U.S. PATENT DOCUMENTS 5,760,826 A * 6/1998 Nayar ......................... 348/36
5,920,337 A * 7/1999 Glassman et al. ............ 348/36
6,304,285 B1 * 10/2001 Geng .......................... 348/36
6,445,807 B1 * 9/2002 Katayama et al. .......... 382/100

FOREIGN PATENT DOCUMENTS

| | | |
|---|---|---|
| JP | 6-124328 | 5/1994 |
| JP | 9-62861 | 3/1997 |
| JP | 9-161096 | 6/1997 |
| JP | 11-259673 | 9/1999 |

* cited by examiner

*Primary Examiner*—Gims Philippe
(74) *Attorney, Agent, or Firm*—Parkhurst & Wendel, L.L.P.

(57) ABSTRACT

An omnidirectional video apparatus that operates when an image at an arbitrary view point is cut out from an omnidirectional image for reproduction, to minimize the amount of information transferred if all directions are stored in another apparatus is provided. Only positional information from an omnidirectional image position storage means (3) is displayed on an image pickup position display means (4) of a terminal device via a bidirectional communication means (10). A view point position indicating means (5) specifies a required view point position. An image converting means (6) of a supply center extracts required images from the omnidirectional image position storage means (3) depending on the view point position indicated by the view point position indicating means (5) and transmits the images via the bidirectional communication means (10) to the terminal device for display.

11 Claims, 15 Drawing Sheets

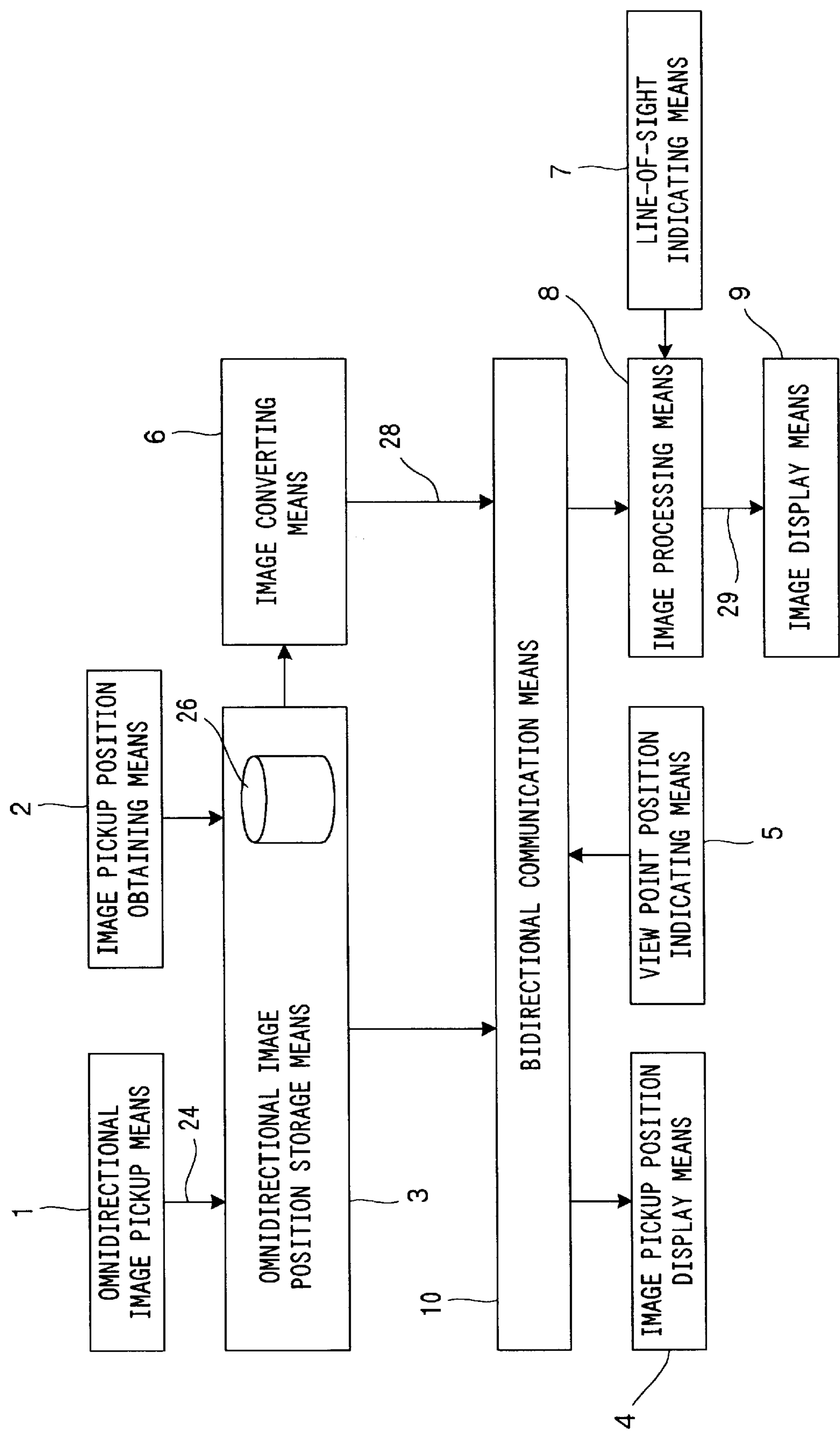
F I G. 1
1
OMNIDIRECTIONAL IMAGE PICKUP MEANS
24
2
IMAGE PICKUP POSITION OBTAINING MEANS
26
OMNIDIRECTIONAL IMAGE POSITION STORAGE MEANS
3
6
IMAGE CONVERTING MEANS
28
10
BIDIRECTIONAL COMMUNICATION MEANS
4
IMAGE PICKUP POSITION DISPLAY MEANS
VIEW POINT POSITION INDICATING MEANS
5
8
IMAGE PROCESSING MEANS
29
7
LINE-OF-SIGHT INDICATING MEANS
9
IMAGE DISPLAY MEANS

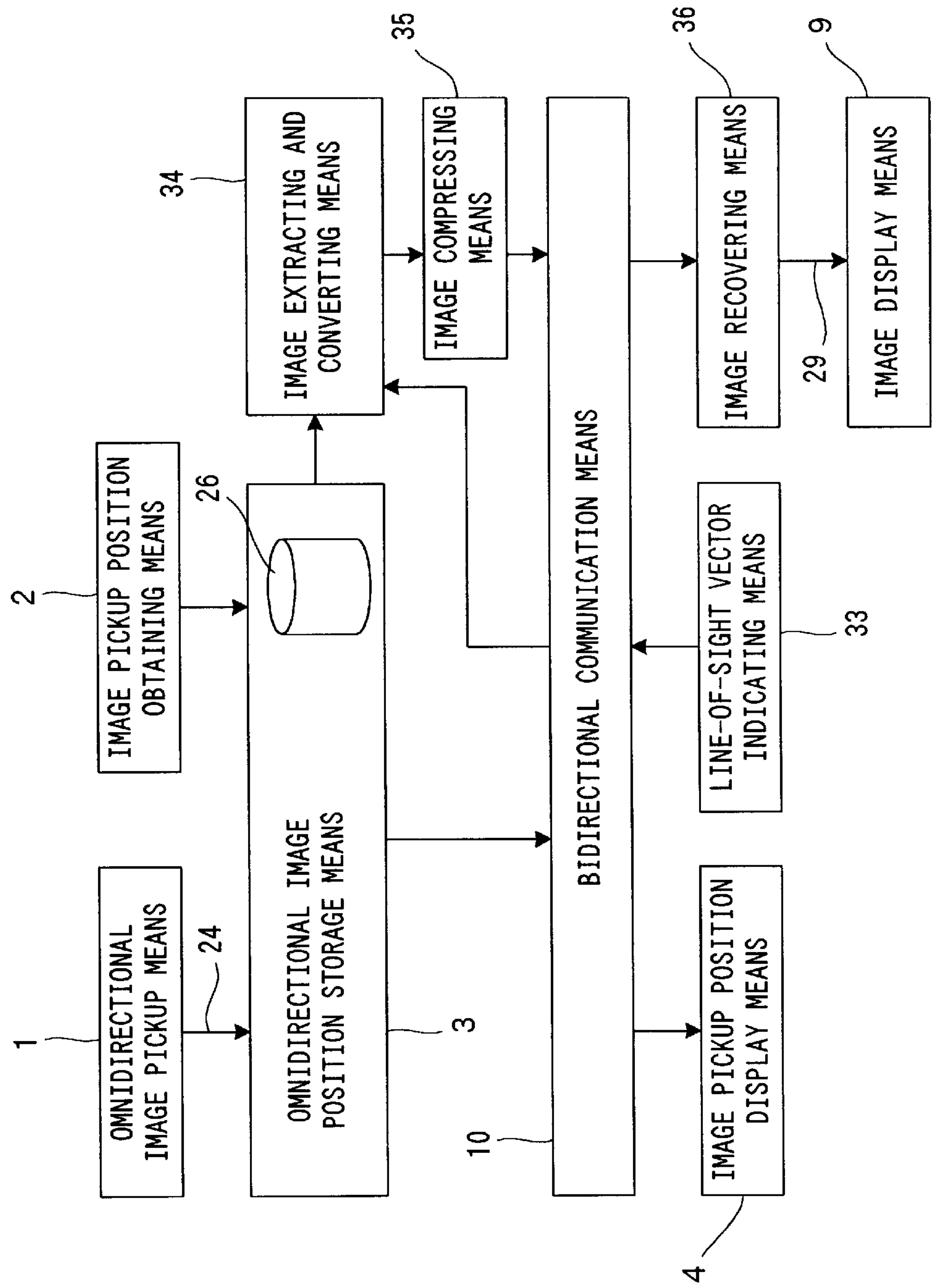
F I G . 1 3
OMNIDIRECTIONAL IMAGE PICKUP MEANS
1
24
IMAGE PICKUP POSITION OBTAINING MEANS
2
OMNIDIRECTIONAL IMAGE POSITION STORAGE MEANS
3
26
IMAGE EXTRACTING AND CONVERTING MEANS
34
IMAGE COMPRESSING MEANS
35
BIDIRECTIONAL COMMUNICATION MEANS
10
IMAGE PICKUP POSITION DISPLAY MEANS
4
LINE-OF-SIGHT VECTOR INDICATING MEANS
33
IMAGE RECOVERING MEANS
36
29
IMAGE DISPLAY MEANS
9

F I G . 1 8
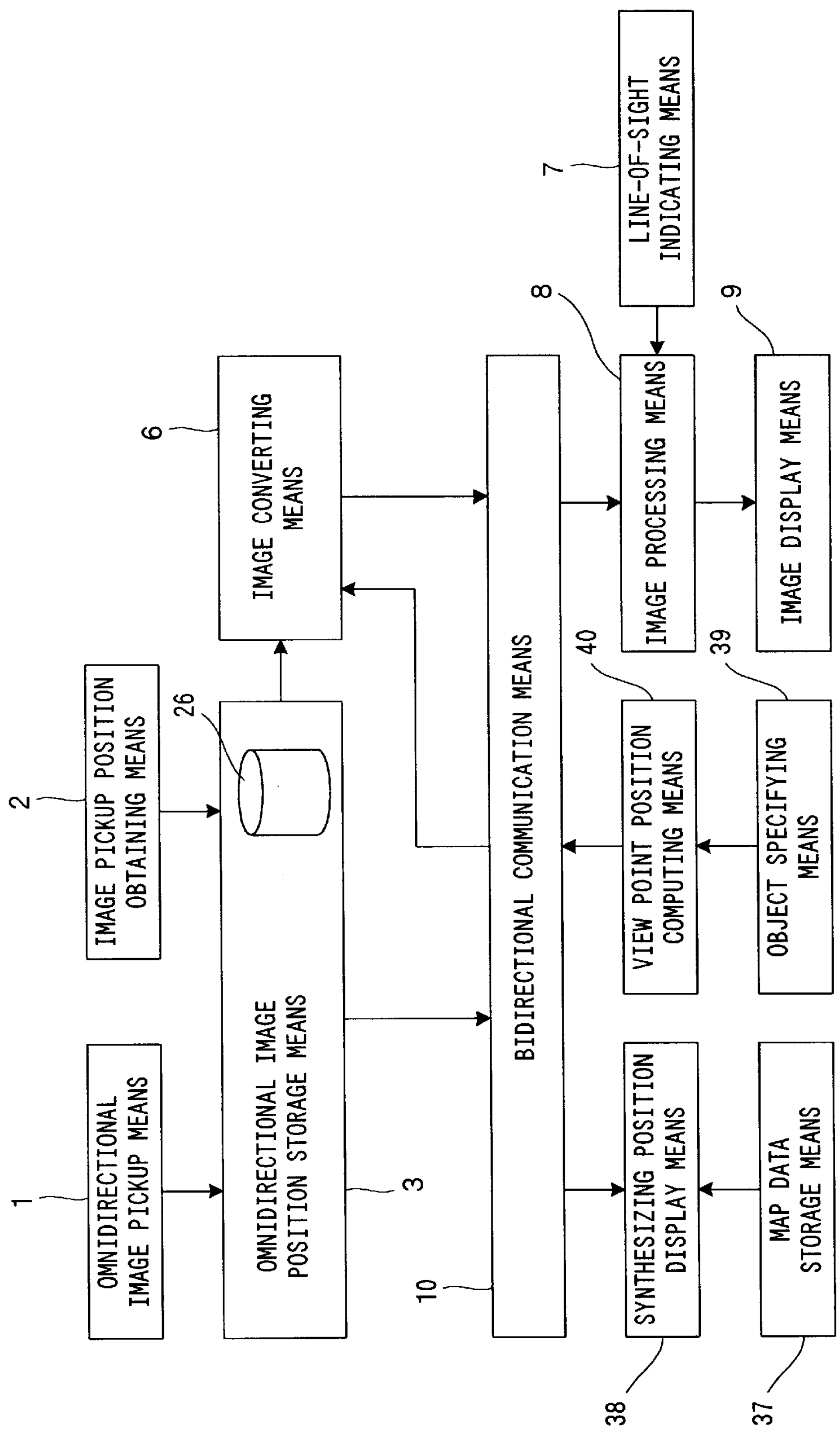

OMNIDIRECTIONAL VIDEO OUTPUT METHOD AND APPARATUS

DESCRIPTION

1. Technical Field

The present invention relates to an apparatus for processing panoramic images or the like which have been photographed in all directions.

2. Background Art

It is strongly desired to observe surrounding environments at a certain view point as if the viewer was at that site. Specifically, if a viewing direction for an image of scenery photographed during a trip can be freely varied to display scenery extending in the viewing direction, the viewer can feel as if he or she was looking around though he or she is not actually at that site.

If the viewing direction can be freely varied for an image such as that obtained using a fisheye lens or an omnidirectional image obtained using a reflection mirror, which image has a field of view much larger than that obtained by a normal camera lens, the feeling of being at the site is further improved.

Japanese Patent Laid-Open No. 9-62861 discloses an apparatus for storing panoramic images photographed around a view point moving while traveling through space as well as a relative-moving position from a certain point.

In reproducing an image, an image extending in a specified viewing direction is synthesized from the panoramic image stored in the apparatus, and the synthesized image is displayed. When the user indicates a next view point or line of sight, a next image is correspondingly invoked, computed, and displayed; this operation is repeated.

The view point is a position where an image is photographed, and the line of sight is a direction in which a viewer looks at the view point position.

FIG. 21 shows a process loop of image reproduction according to this conventional technique.

The following description follows this process loop.

S201 is a loop in which an image is repeatedly synthesized and displayed.

At S202, a view point and a line-of-sight direction for a traveling path are initially computed. After the start loop, the next view point position and line-of-sight direction to be displayed are computed and determined from a relative movement computed at S206, relative to the current view point and line-of-sight direction.

At S203, a panoramic image corresponding to the view point position determined at S202 is loaded.

At S204, an image extending in the line-of-sight direction determined at S202 is synthesized from the panoramic image.

At S205, the image synthesized at S204 is displayed.

At S206, a user views the image displayed at S205 to indicate movement of the view point and the line-of-sight direction in which a visual angle is moved.

At S207, the process returns to S201 to repeat processing from S202 to S206.

At S206, the user can command move forward, move backward, stop, clockwise rotation, counterclockwise rotation, upward rotation, downward rotation, enlargement, contraction, and end.

Additionally, by retaining history of the view point position and line-of-sight direction, this conventional apparatus can predict the next possible view point position and line-of-sight direction to be indicated by the user in order to load a required image in advance, thereby achieving fast display.

In this manner, for a video photographed in all directions during movement, the conventional apparatus repeatedly invokes, for each reproduction, images photographed at a view point position and in a line-of-sight direction dependent on the user's command and synthesizes and displays the images, to provide the user with images that provide him or her with the feeling of being at the site.

The above described conventional apparatus, however, still has the following problems:

<1> An image photographed while traveling through space is retained, and the user checks the reproduced image, indicates relative viewpoint and line-of-sight direction for the image to obtain a result, and then synthesizes the next image to be displayed. Thus, after the information on the view point and the line-of-sight direction has been provided, a required image is invoked from all stored images and then displayed after the image synthesis process. Consequently, the reproduction is delayed.

In particular, when panoramic images and relative-moving positions are stored at another site on the Internet and a communication means that is relatively slow in communicating data is used for reproduction, the reproduction is more significantly delayed.

<2> When the next possible view point position and line-of-sight direction to be indicated by the user are predicted by retaining the history of the view point position and line-of-sight direction for the displayed image, the reproduction speed increases to some degree. When, however, the viewpoint position is moved in an unpredictable direction, new invocation of an image and new computations therefor are required to thereby reduce the reproduction speed to prevent the smooth passage of time for the reproduced image, thereby degrading the feeling of being at the site.

<3> A position to which the viewpoint is to be moved is specified based on a relative position along the traveling path, so that the image can only be repeatedly moved forward and backward along the sequence of images photographed while traveling through space. Accordingly, the display of an image on an unwanted path cannot be deleted.

<4> The position to which the view point is to be moved is specified based on a relative position along the traveling path, so that user does not know which way to take next time in an image photographed at a site visited by the user for the first time. As a result, the user must reach the target by repeating moving forward and backward as required.

DISCLOSURE OF INVENTION

It is an object of the present invention to provide an omnidirectional video output method that enables fast reproduction and provides users with the feeling of being at the site.

It is another object of the present invention to provide an omnidirectional-video output method that allows a user to easily input desired traveling path and line of sight to a terminal device to receive display of only images on a required path.

An omnidirectional video output method according to the present invention comprises transmitting image pickup position data representing a service area having omnidirectional images, from a supply center to a terminal device, and transmitting at least view point information of desired view point information and line-of-sight information from the terminal device to the supply center. When only the view point information is transmitted from the terminal device to the supply center, only image information for a traveling path desired by the terminal device is transmitted from the supply center to the terminal device, which then processes and outputs the information depending on the desired view point. When the view point and line-of-sight information is transmitted from the terminal device to the supply center, only image information for a traveling path desired by the terminal device is processed depending on the desired line of sight based on the view point and line-of-sight information received from the terminal device and is then transmitted from the supply center to the terminal device, which then outputs the information.

According to the configuration of the present invention, the amount of data in information between the supply center and the terminal device is reduced to increase the reproduction speed, thereby providing users with the feeling of being at the site.

This configuration also improves the input method for the terminal device to facilitate the operation of inputting the desired traveling path and line of sight.

In addition, when the terminal device indicates the desired view point to the supply center, the supply center presents image pickup position data for omnidirectional images to the terminal device, which receives, based on the image pickup position data, image information for a desired traveling path determined depending on the desired view point. Accordingly, the user can easily input the desired traveling path and can continuously view only images on the desired traveling path in such a manner that the reproduction time passes smoothly.

Further, if not only the view point information but also the line-of-sight information is transmitted from the terminal device to the supply center, the supply center extracts omnidirectional images from an omnidirectional image position file based on the view point information, subsequently processes the images based on the line-of-sight information, and then transmits only the required image to the terminal device for display. Consequently, the user can enjoy an all-image display that provides users with the feeling of being at the site, regardless of an arithmetic-operation process speed of the terminal device.

BRIEF DESCRIPTION OF DRAWINGS

FIG. 1 is a block diagram of an omnidirectional video apparatus according to (Embodiment 1) of the present invention;

FIG. 13 is a block diagram of an omnidirectional video apparatus according to (Embodiment 2) of the present invention;

FIG. 18 is a block diagram of an omnidirectional video apparatus according to (Embodiment 4) of the present invention;

BEST MODE FOR CARRYING OUT THE INVENTION

Figure 2:
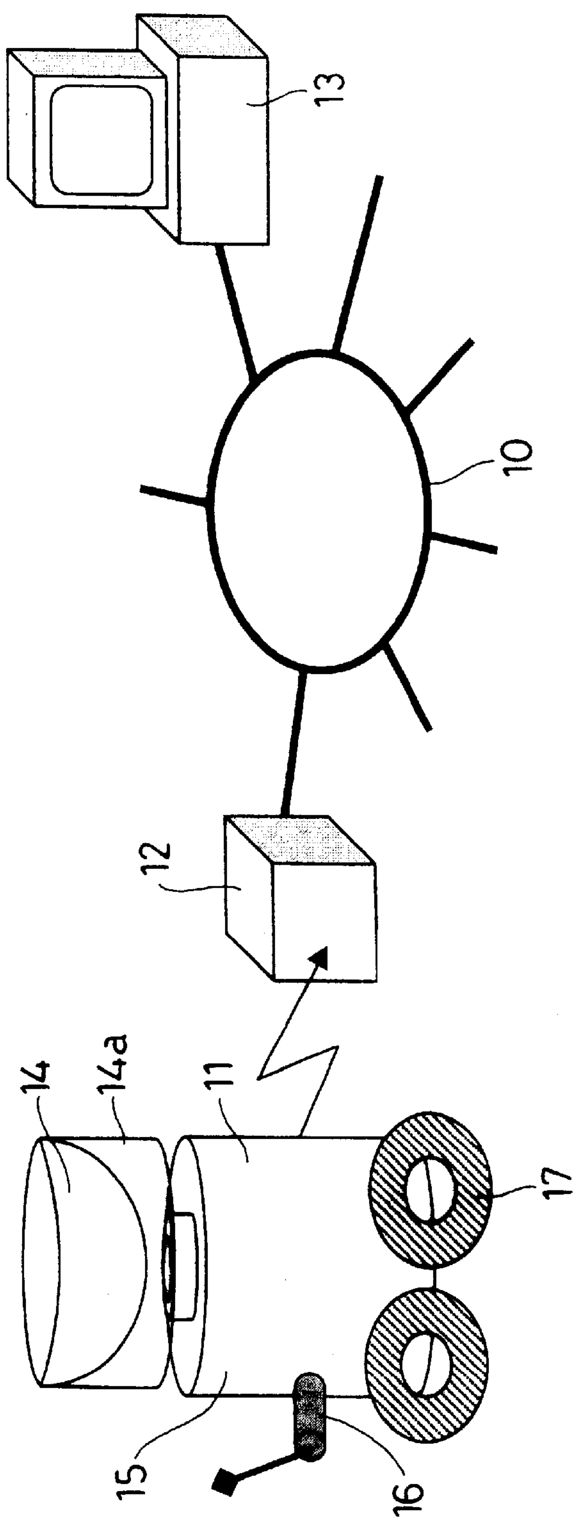
FIG. 2 is a schematic view of the system configuration of the omnidirectional video apparatus according to this embodiment.

Each embodiment of the present invention will be explained below with reference to FIGS. 1 to 20.

Embodiment 1

FIGS. 1 to 12 show (Embodiment 1).

FIG. 1 is an omnidirectional video apparatus according to Embodiment 1.

An omnidirectional image pickup means 1 photographs omnidirectional images at a view point position to output image data. An image pickup position obtaining means 2 obtains positions where the omnidirectional image pickup means 1 picked up the images. The images picked up by the omnidirectional image pickup means 1 and the image pickup positions obtained by the image pickup position obtaining means 2 are stored in an omnidirectional image position storage means 3.

The omnidirectional image position storage means 3 and an image pickup position display means 4 are connected together via a bidirectional communication means 10 so that image pickup positions stored in the omnidirectional image position storage means 3 are displayed on the image pickup position display means 4.

A user specifies one of the image pickup positions displayed by the image pickup position display means 4, as his or her desired view point position, by inputting it to a view point position indicating means 5. The view point position indicating means 5 is connected to an image converting means 6 via a bidirectional communication means 10, and the image converting means 6 invokes from the omnidirectional view point position storage means 3 an image recorded at a position indicated by the view point position indicating means 5 and geometrically converts and rearranges the image, which was photographed in all directions.

The image converting means 6 is connected to an image processing means 8 via the bidirectional communication means 10, and the image processing means 8 has a line-of-sight indicating means 7 connected thereto for indicating a line-of-sight direction and an angle of view for the image obtained from the image converting means 6.

The image processing means 8 cuts a partial image out from the image obtained from the image converting means 6 depending on the line-of-sight direction and angle of view specified by the line-of-sight indicating means 7. The partial image obtained by the image processing means 8 by cutting out the original image is displayed by the image display means 9.

Specifically, the omnidirectional image pickup means 1 and the image pickup position obtaining means 2 are provided in a video sensor device 11 in an arrangement drawing of the entire system shown in FIG. 2. The omnidirectional image position storage means 3 and the image converting means 6 are provided in a supply center 12. The image pickup position display means 4, the view point position indicating means 5, the line-of-sight indicating means 7, the image processing means 8, and the image display means 9 are provided in a terminal device 13. The supply center 12 and the terminal device 13 are connected together via the bidirectional communication means 10 for bidirectional information communication.

Although FIG. 2 shows the one supply center 12 and the one terminal device 13, a plurality of supply centers or terminal devices may be connected to the bidirectional communication means 10.

The video sensor device 11 is configured to move in a direction perpendicular to the direction of an optical axis of a television camera 15 while mounting a mirror 14 and the television camera 15 on a traveling device 17. In this explanation, the traveling device 17 moves on a horizontal plane.

The television camera 15 is installed in such a manner that the optical axis extends in a vertical direction, to pick up an image reflected by the mirror 14. The mirror 14 is installed in such a manner that the optical axis of the television camera 15 aligns with the center axis of the mirror 14 so that the image reflected by the mirror 14 can be picked up to obtain an omnidirectional image around the optical axis of the television camera 15 at one time.

Specifically, the mirror 14 is a curved surface that is symmetrical with respect to the axis. It may be shaped into a cone or a spherical surface but will be described as having a hyperboloid. Reference numeral 14a denotes a cylindrical translucent body for supporting the mirror 14 at a target position. In this embodiment, however, a method for picking up an image extending around a view point position through 360° using the mirror 14, but for example, a fisheye lens may be used for image pickup or the camera may be rotated to synthesize picked-up images, as long as the image can be arranged around the view point position through 360°.

Additionally, in the following description, the video sensor device 11 is used outdoors.

During outdoor image pickup, brightness is not uniform in all directions, so that the user often fails to pick up appropriate omnidirectional images with a fixed exposure. Thus, the television camera 15 can desirably obtain dynamic-range images that are larger than those obtained by normal cameras; a preferable television camera can synthesize images obtained with a normal exposure and a short-time exposure, into one field.

The video sensor device 11 has a GPS device 16 mounted thereon as the image pickup position obtaining means 2, to obtain global positions of the video sensor device 11. The GPS device 16 obtains its own position on the earth (latitude and longitude) via a satellite (not shown). A preferable GPS is a differential one that can obtain its own position by detecting its relative position to a certain point the latitude and longitude of which are known.

First, an omnidirectional image picked up by the video sensor device 11 will be explained with reference to FIGS. 3 and 4.

Figure 3:
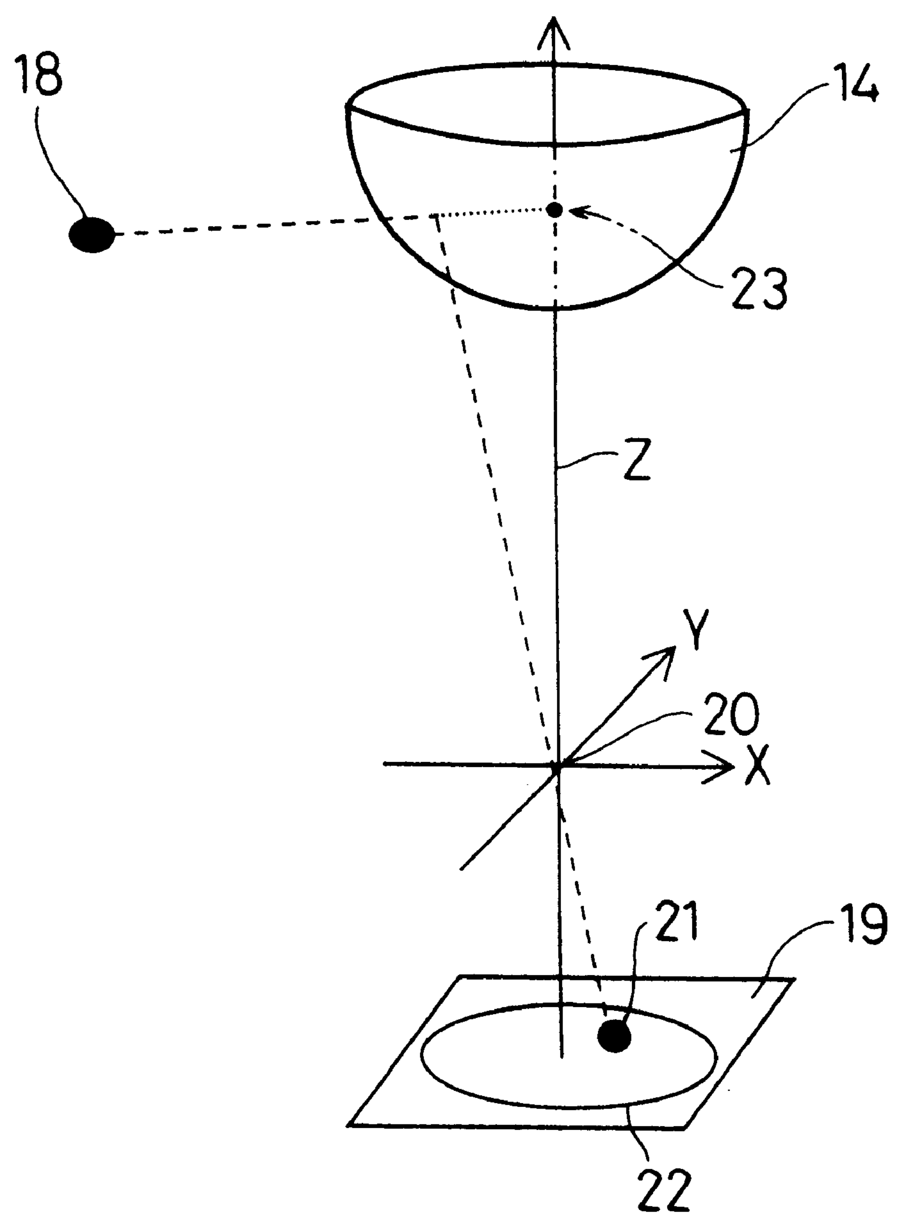
FIG. 3 is a view useful in explaining the principle of image pickup of omnidirectional images according to this embodiment.

FIG. 3 is a view useful in explaining the principle of image pickup of an omnidirectional image. Reference numeral 18 denotes a photographing object. Reference numeral 19 denotes an image forming plane of the television camera 15. Reference numeral 20 is a focal point of the television camera 15. Reference numeral 21 denotes a position on the image forming plane 19 where the photographing object 18 is formed into an image. Reference numeral 22 denotes an area of the formed image obtained by image pickup in all directions.

Coordinate axes X and Y are set on a plane parallel with the image forming plane 19 using a focal point 20 of the television camera 20 as an origin. In addition, a Z axis is set in a direction perpendicular to the image forming plane 19 using the focal point 20 of the television camera 15 as an origin. The center axis of the mirror 14 aligns with the Z axis. In this case, an image of the photographing object 18 has its direction changed by the mirror 14 and passes through the focal point 20 of the television camera before reaching an image forming position 21 on the image forming plane 19.

Since the mirror 14 is shaped into a hyperboloid, an extension of a beam directed from the photographing object 18 to the mirror 14 always passe through a point 23 on the Z axis despite a change in the position of the photographing object. Reference numeral 23 is referred to as a "virtual focal point".

Thus, the formed image 22 corresponds to an image observed from the virtual focal point 23 through an azimuth of 360° around the X axis. An elevation direction at the virtual focal point 23 from an XY plane varies depending on the angle of view of the television camera 15.

In this manner, images observed through 360° around the Z axis in the azimuth direction and at a predetermined elevation direction are formed in the area 22 of the formed image at one time. The circular formed image thus obtained is referred to as an "omnidirectional image".

Figure 4:
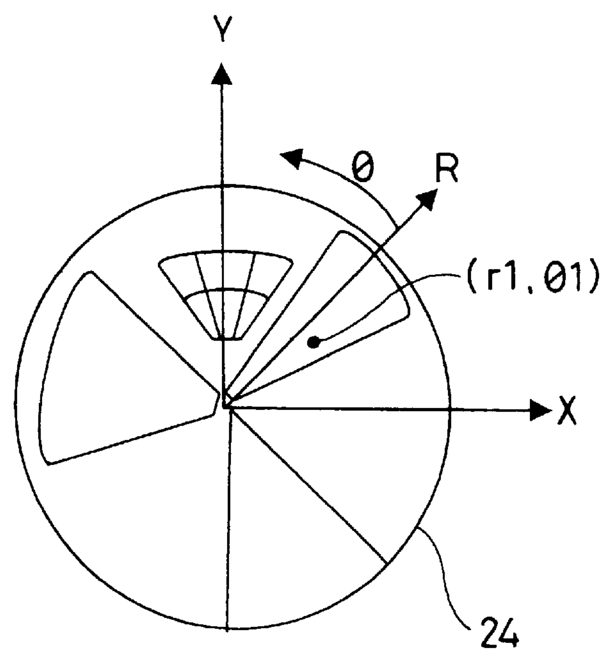
FIG. 4 is a schematic view of omnidirectional images according to this embodiment.

An example of an omnidirectional image is shown in FIG. 4.

Reference numeral 24 denotes an omnidirectional image that is circular. In this case, when a radial direction of the omnidirectional image 24 is denoted by R and its circumferential direction is denoted by θ, the radial direction R corresponds to the direction of the elevation angle of the line of sight from the virtual focal point 23 in FIG. 3, and the circumferential direction θ corresponds to the direction of the azimuth of the line of sight from the virtual focal point 23 in FIG. 3.

Next, a method for obtaining an image and positional information stored in the omnidirectional image position storage means 3 and how the image and the information are recorded therein will be described with reference to FIGS. 5 and 6.

Figure 5:
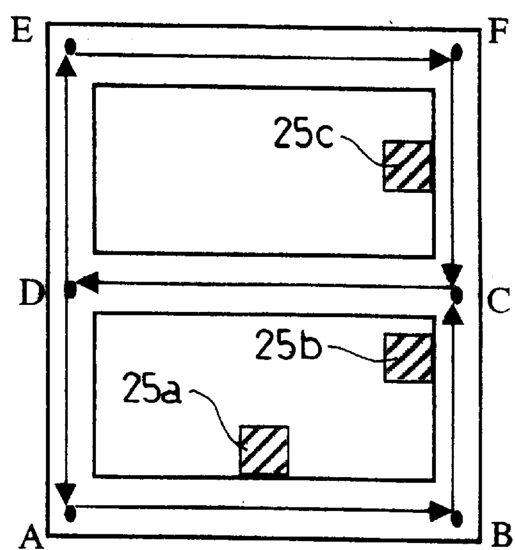
FIG. 5 is a view useful in explaining a traveling path for a video sensor according to this embodiment.

FIG. 5 is an image showing a traveling path of the video sensor device 11. The arrow shows a traveling direction, indicating that the device starts from point A and moves in the order of A, B, C, D, E, F, C, D, and A. Reference numerals 25*a*, 25*b*, and 25*c* denote the positions of buildings located on the path.

While moving along the traveling path shown in FIG. 5, the video sensor device 11 uses the television camera 15 and the GPS device 16 mounted thereon to obtain an omnidirectional image and positional information and then transmits them to the supply center 12. The transmission of the omnidirectional image and positional information from the video sensor device 11 to the supply center 12 can be implemented by using radio or wired communication or recording them on a recording medium such as a DVD.

Figure 6:
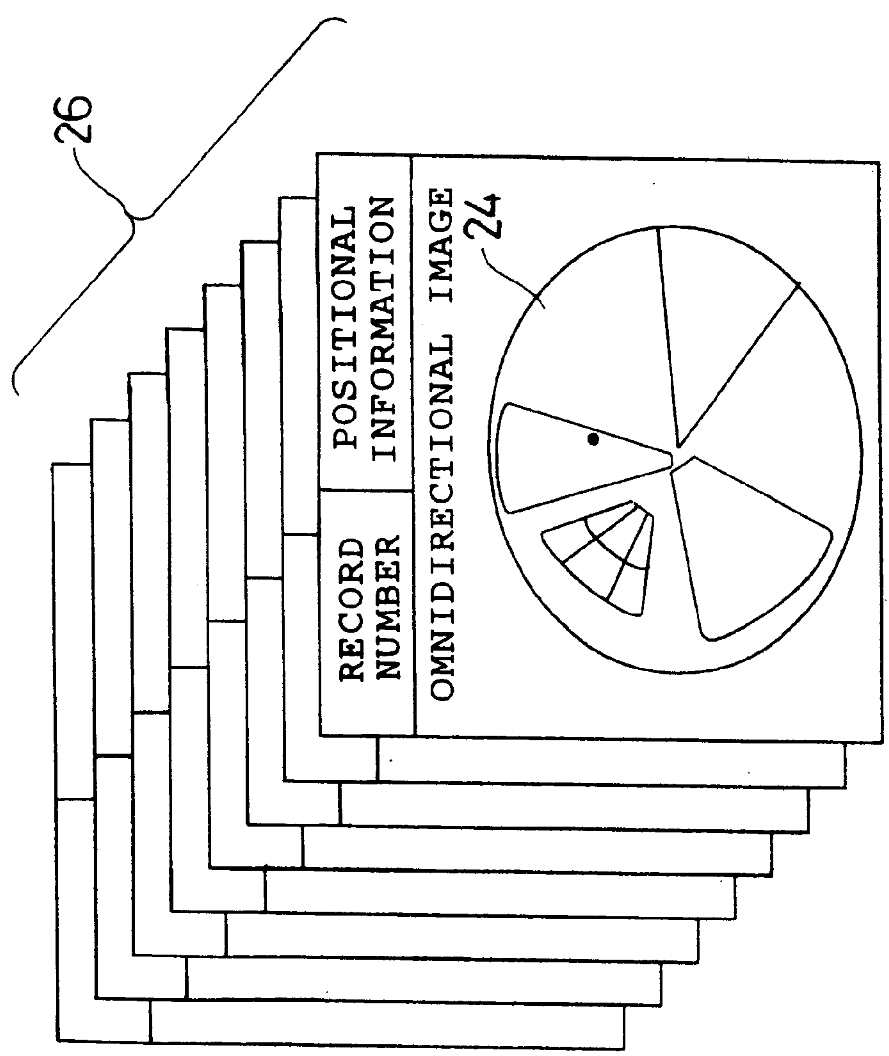
FIG. 6 is a view useful in explaining an omnidirectional image position file according to this embodiment.

FIG. 6 is a schematic view showing how omnidirectional images and positions are recorded in the supply center 12.

In FIG. 6, reference numeral 26 denotes an omnidirectional image position file in which are recorded omnidirectional images photographed at the same time and their positions which are allocated with record numbers. For explanation, the case where the omnidirectional image and positional information are recorded together is shown, but they may be individually recorded and have the same record number attached thereto.

At an arbitrary point of time after the omnidirectional image and the positional information have been recorded in the omnidirectional image position storage means 3, the bidirectional communication means 10 starts communication between the supply center 12 and the terminal device 13 in response to a command from the terminal device 13.

Operational steps executed by the omnidirectional video device after start of communication will be explained below with reference to FIGS. 7 to 12.

(Step 1-1)

The omnidirectional image position storage means 3 has the omnidirectional image position file 26 recorded therein as shown in FIG. 6. First, positional information and a record number are obtained, and all image pickup positions are displayed on the image pickup position display means 4 of the terminal device 13 via the bidirectional communication means 10.

Figure 7:
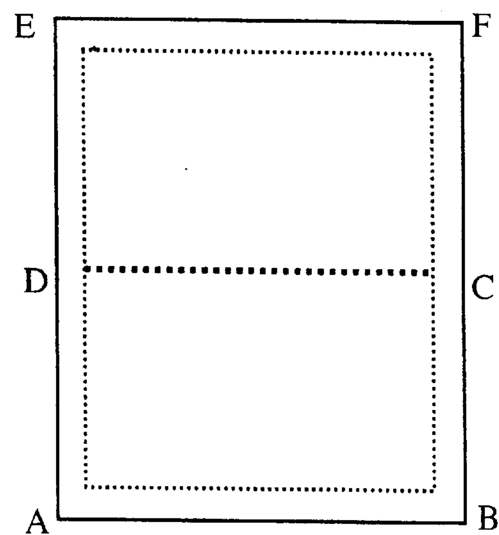
FIG. 7 is a view useful in explaining a result of display of all image pickup positions according to this embodiment.

FIG. 7 shows all image pickup positions displayed on the image pickup position display means 4. Dotted lines in FIG. 7 show the image pickup position.

Since the positional information is provided as latitude and longitude information obtained by the GPS device 16, the image pickup position display means 4 displays the latitude and longitude information on a reduced scale. Characters A, B, C, D, E, and F in FIG. 7 indicating positions are for explanation only and are not displayed on the image pickup position display means 4.

(Step 1-2)

Figure 8:
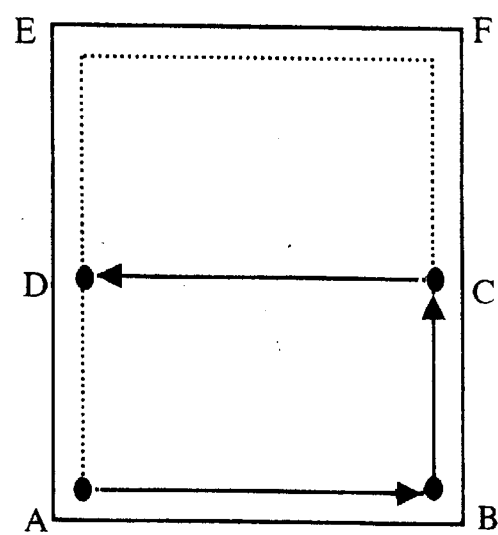
FIG. 8 is a view useful in explaining a result of indication of an observation path.

The user, who has checked all the image pickup positions displayed on the image pickup position display means 4 at (step 1–1), specifies the user's desired observation path from all the image pickup positions using the view point position indicating means 5. FIG. 8 shows a result of the indication of the observation path using the view point position indicating means 5. This figure shows, for example, a result of the indication of a path passing through the points A, B, C, and D. In this embodiment, the continuous observation path is selected using the view point position indicating means 5, but a discontinuous observation path such as A-B and E-F may be selected.

Specific examples of the image pickup position display means 4 and the view point position indicating means 5 will be described. The terminal device 13 recognizes all the image pickup positions and displays them on a display screen of the terminal device 13 in the format shown in FIG. 7. The user uses as an input device a touch panel mounted in such a manner as to overlap the display screen, to touch via the touch panel the display screen of all the image pickup positions at positions corresponding to the observation path, thereby inputting the indicated positions. Alternatively, the user inputs the observation path from a keyboard of the terminal device 13.

(Step 1-3)

Record numbers corresponding to the positions of the observation path indicated by the view point position indicating means 5 at (Step 1-2) are arranged in the order of observation and then transmitted to the image converting means 6 via the bidirectional communication means 10.

(Step 1-4)

Omnidirectional images corresponding to the record numbers transmitted from the view point position indicating means 5 at (Step 1-3) are invoked from the omnidirectional image position storage means 3 and transmitted to the image converting means 6.

(Step 1-5)

The omnidirectional images transmitted to the image converging means 6 at (Step 1-4) are converted. The process method executed by the image converting means 6 will be explained with reference to FIGS. 3, 4, 9, and 10.

Figure 9:
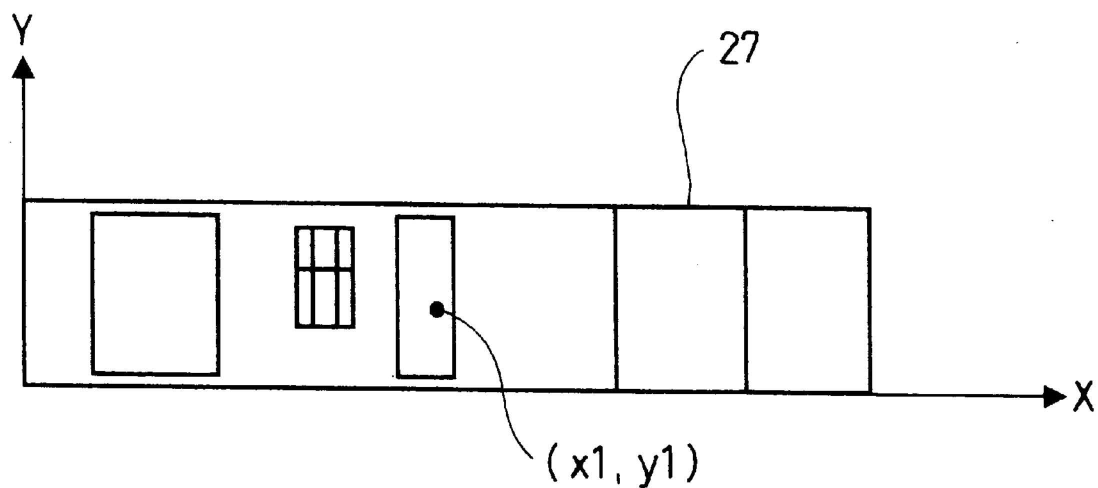
FIG. 9 is a schematic view of a expanded image according to this embodiment.

FIG. 9 shows an image into which the omnidirectional image 24 in FIG. 4 has been converted and which is assumed to be observed from the virtual focal point 23 shown in FIG. 3. This image is hereafter referred to as a "expanded image 27".

An X direction of the expanded image 27 corresponds to an azimuth direction θ around the Z axis observed from the virtual focal point 23, thereby allowing an image extending through an azimuth of 360° to be obtained. In addition, a Y direction of the image corresponds to the elevation direction R observed from the virtual focal point 23.

Accordingly, when an arbitrary point (R1, θ1) in the omnidirectional image 24 in FIG. 4 is converted into a position of coordinates (x1, y1) in the expanded image 27, the following equation is established.

$$(x1, y1)=F(r1, \theta 1) \quad (1)$$

A function F is a coordinate converting function and is well known, so detailed description thereof is omitted.

At (Step 1-4), the image converting means 6 invokes the omnidirectional images 24 corresponding to the record numbers transmitted from the view point position indicating means 5 and converts them into the expanded images 27. The image converting means 6 then rearranges the expanded images 27 in the order of the observation path specified by the view point position indicating means 5.

Figure 10:
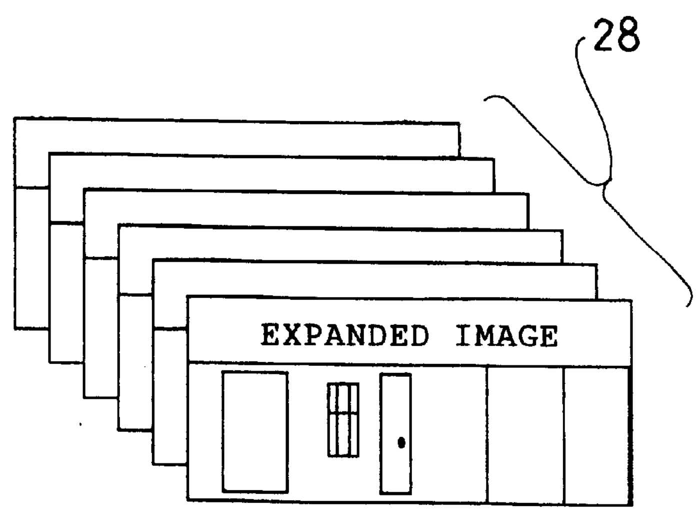
FIG. 10 is a view useful in explaining a expanded image file according to this embodiment.

FIG. 10 shows a sequence of the expanded images 27 thus obtained. As shown in this figure, a expanded image file 28 having the expanded images 27 arranged in the order of the observation is created and transmitted to the image processing means 8 via the bidirectional communication means 10.

(Step 1-6)

The process method executed by the line-of-sight indicating means 7 and the image processing means 8 will be explained with reference to FIGS. 10, 11, and 12.

Figure 11:
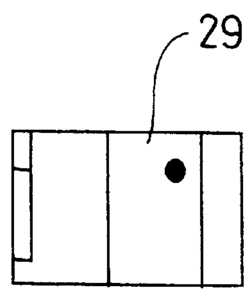
FIG. 11 is a view useful in explaining a window image according to this embodiment.

FIG. 11 shows an example of an image obtained by the image processing means 8 by cutting a partial area out from the expanded image 27 in FIG. 9. This image is hereafter referred to as a "window image 29".

The window image 29 in FIG. 11 is obtained by specifying a line-of-sight direction, that is, an elevation angle and an azimuth and cutting the partial area out from the expanded image 27 in FIG. 9. The size of the cut-out area corresponds to the angle of view from the observation point.

(Step 1-6) will be explained below in detail.

(Step 1-6-(1))

First, the image processing means 8 uses preset predetermined elevation angle and azimuth to create a first window image 29 from the expanded image file 28 in FIG. 10 transmitted via the bidirectional communication means 10 at (step 1–5), and then displays this window image on the image display means 9. FIG. 12 is a schematic view of the sight indicating means 7.

(Step 1-6-(2))

Then, the user uses the line-of-sight indicating means 7 to change the line-of-sight direction and the angle of view for the image displayed on the image display means 9. FIG. 12 is a schematic view of the sight indicating means 7.

Figure 12:
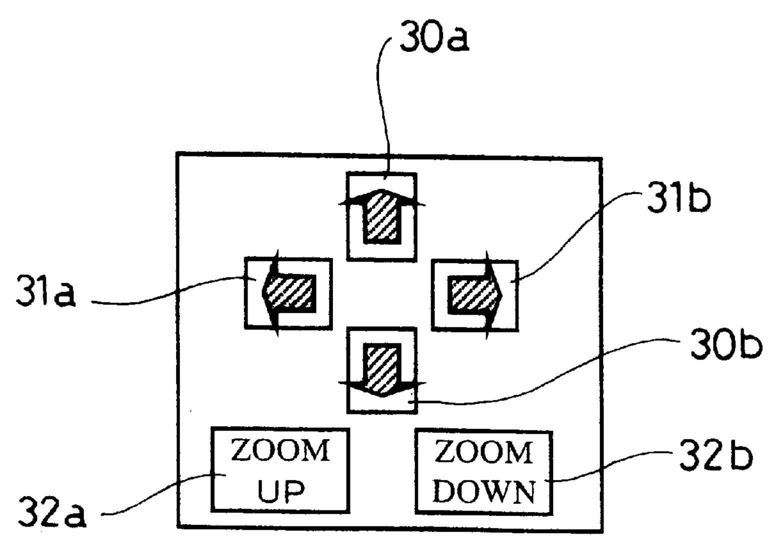
FIG. 12 is a view useful in explaining a line-of-sight indicating means according to this embodiment.

In FIG. 12, reference numerals 30*a* and 30*b* denote elevation angle indicating buttons, reference numerals 31*a* and 31*b* denote azimuth indicating buttons, and 32*a* and 32*b* denote angle of view indicating buttons. These are displayed on the image display means 9 and operated by the user using a mouse or the like. In addition, they may be implemented by allocating corresponding functions to ten keys of the keyboard.

(Step 1-6-(3))

Next, the line-of-sight direction and angle of view changed by the line-of-sight indicating means 7 are transmitted to the image processing means 8, and the cut-out area is changed for the next expanded image to create the window image 29, which is then displayed on the image display means 9. Then, (Step 1-6-(2)) and (step 1–6-(3)) are repeated until all the expanded images 27 in the expanded image file 28 have been processed.

As described above, according to this embodiment, the positions at which the omnidirectional image 24 was photographed are presented to the user beforehand so that an image free from information on unwanted paths and containing only a required view point position can be created and transmitted. Consequently, the images of all the photographed areas need not be transmitted to thereby reduce the amount of communicated data and thus communication costs. Additionally, the user can display images promptly to reduce the amount of waiting time.

Embodiment 2

Figure 14:
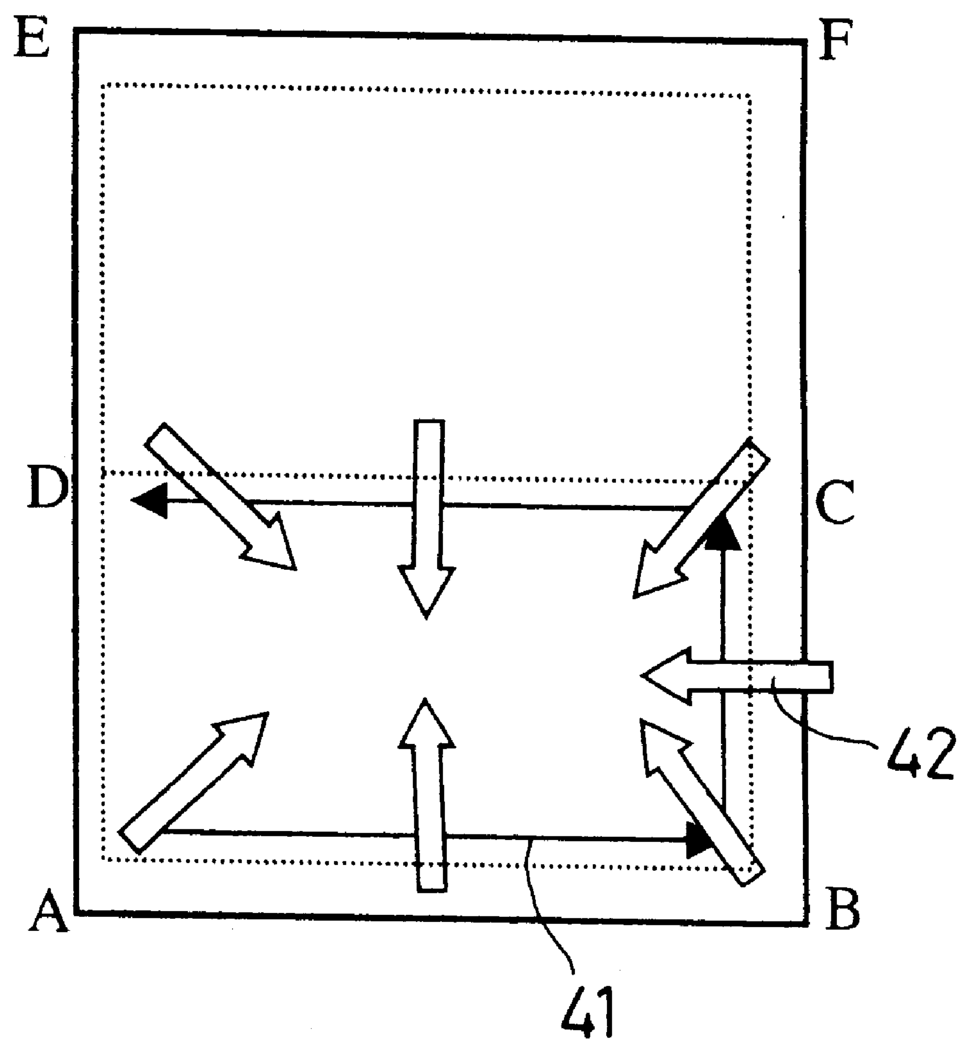
FIG. 14 is a view useful in explaining a result of, indication of an observation path.

FIGS. 13 and 14 show (Embodiment 2).

FIG. 13 shows an omnidirectional video apparatus according to (Embodiment 2). The omnidirectional image pickup means 1, the image pickup position obtaining means 2, the omnidirectional image position storage means 3, and the image pickup position display means 4 are the same as those of (Embodiment 1).

In (Embodiment 1), the terminal device 13 inputs a desired view point and then processes data received from the supply center 12 depending on its desired line of sight to obtain a target display screen. (Embodiment 2) differs from (Embodiment 1) in that not only the desired view point but also a line-of-sight direction are specified and communicated to the supply center 12 to obtain the target display screen without the need to reprocess data returned to the terminal device 13 from the supply center 12.

A line-of-sight vector indicating means 33 provided in the terminal device 13 similarly to the image pickup position display means 4 specifies user's desired view point position and line-of-sight direction for an image pickup position displayed by the image pickup position display means 4. An output from the line-of-sight vector indicating means 33 is input to an image extracting and converting means 34 via the bidirectional communication means 10.

The image extracting and converting means 34 provided in the supply center 12 invokes the omnidirectional image 24 from the omnidirectional image position file 26,of the omnidirectional image position storage means 3, the omnidirectional image 24 having been recorded at the view point position indicated by the line-of-sight vector indicating means 33. The image extracting and converting means 34 then generates the window image 29 photographed in the line-of-sight direction indicated by the line-of-sight vector indicating means 33.

A sequence of the window images 29 created by the image extracting and converting means 34 are compressed by the image compressing means 35 and transmitted via the bidirectional communication means 10 to the terminal device 13, where an image recovering means 36 recovers the signal transmitted from the image compressing means 35.

The sequence of images recovered by the image recovering means 36 are displayed on the image display means 9.

(Embodiment 2.) differs from (Embodiment 1) in that the supply center 12 has the omnidirectional image position storage means 3, the image extracting and converting means 34, and the image compressing means 35 and in that the terminal device 13 has the image pickup position display means 4, the line-of-sight vector indicating means 33, the image recovering means 36, and the image display means 9.

The operational steps executed by the omnidirectional video apparatus after communication has been started will be explained.

(Step 2-1)

The omnidirectional image position storage means 3 has the omnidirectional image position file 26 shown in FIG. 6, recorded therein. First, positional information and record numbers are taken out from the storage means, and the image pickup positions are displayed on the image pickup position display means 4 of the terminal device 13 via the bidirectional communication means 10. The image pickup positions displayed by the image pickup position display means 4 are similar to those in FIG. 7.

(Step 2-2)

On checking the image pickup positions displayed on the image pickup position display means 4 at (step 2-1), the user specifies his or her desired observation path and line-of-sight directions for each observation path, from all the image pickup positions, using the line-of-sight vector indicating means 33. FIG. 14 shows the observation path and line-of-sight directions indicated using the line-of-sight vector indicating means 33. The observation path is shown by solid arrows 41, and the line-of-sight directions are denoted by thick white-arrows 42. Specifically, the indication of the observation path is input from the display screen or keyboard (not shown) of the terminal device 13 in the same manner as in (Embodiment 1).

(Step 2-3)

The observation path and line-of-sight directions indicated by the line-of-sight vector indicating means 33, that is, the elevation angle and the azimuth are transmitted to the image extracting and converting means 34 via the bidirectional communication means 10.

(Step 2-4)

The image extracting and converting means 34 invokes the omnidirectional image 24 from the omnidirectional image position storage means 3, the omnidirectional image

24 corresponding to the observation path transmitted from the line-of-sight vector indicating means 33.

(Step 2-5)

The image extracting and converting means 34 uses the omnidirectional image 24 obtained at (Step 2-4) and the line-of-sight directions obtained at (Step 2-3) to create the window images 29 shown in FIG. 11. In this case, the expanded images 27 shown in FIG. 9 need not necessarily be created but the window images 29 are desirably created directly from the omnidirectional images 24.

The created window images 29 are rearranged along the observation path and then transmitted to the image compressing means 35.

(Step 2-6)

The image compressing means 35 compresses the sequence of the window images 29 obtained at (Step 2-5) to reduce the amount of signals. Since the window images 29 have been rearranged in the order of the observation path, for example, the order of display, the image compression may be video compression, for example, that based on the MPEG. The compressed signal is transmitted to the image recovering means 36 of the terminal device 13 via the bidirectional communication means 10.

(Step 2-7)

The image recovering means 36 stores the images transmitted from the image compressing means 35 in a primary buffer (not shown) and recovers and transmits them to the image display means 9 for display.

Thus, according to (Embodiment 2), only images required for display can be transmitted by previously presenting the user the positions at which the omnidirectional images 24 were photographed so that the user can indicate required view point position and line-of-sight direction which are free from information on unwanted paths.

Further, the images are compressed before transmission to reduce the amount of communicated data.

In addition, the user (the terminal device 13) must execute only the process of recovering the images and need not execute conversions based on an image converting process, so that the images are displayed at equal time intervals to provide the user with the feeling of being at the site without compromising smooth display or reproduction.

Embodiment 3

Figure 15:
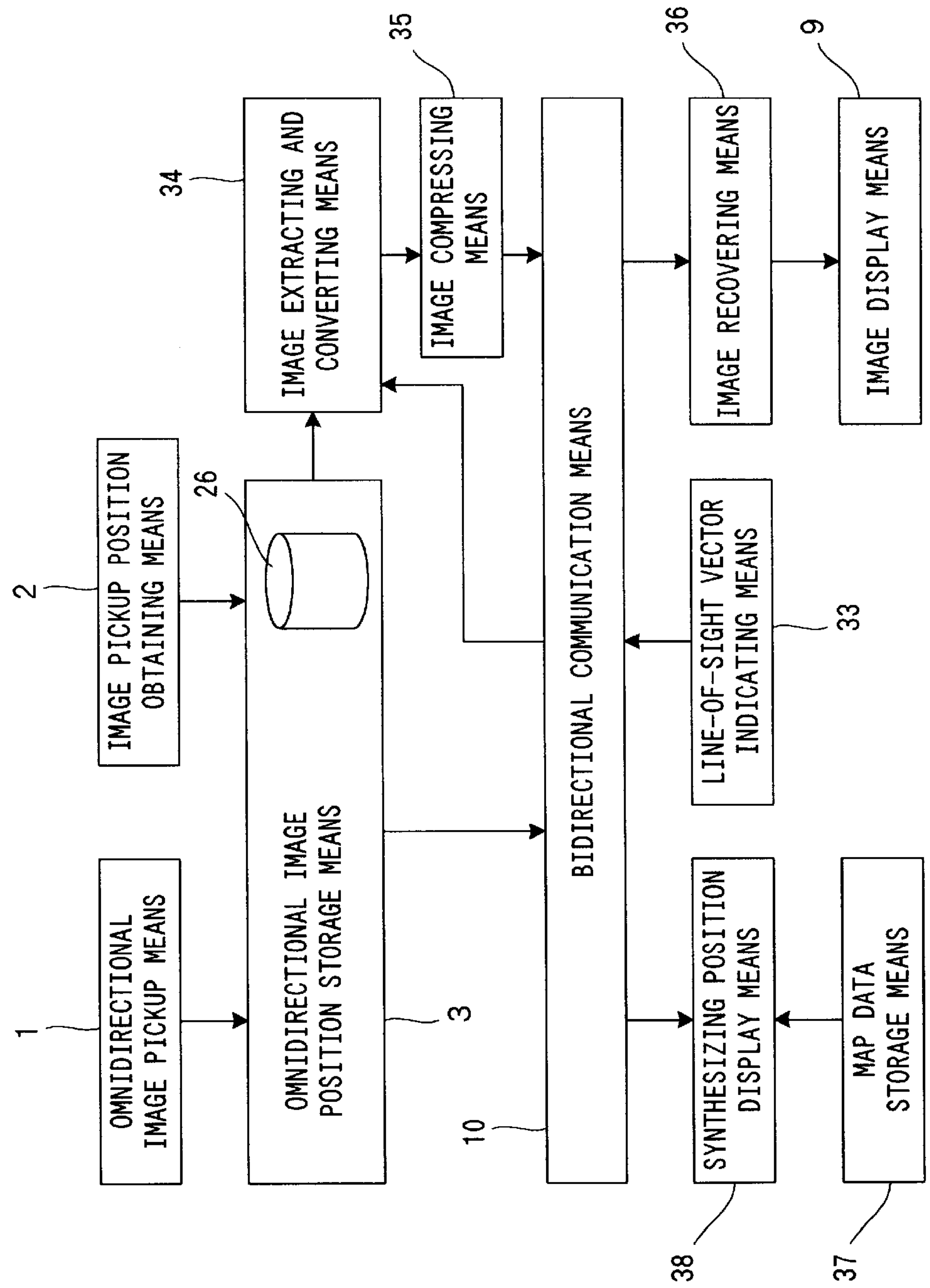
FIG. 15 is a block diagram of an omnidirectional video apparatus according to (Embodiment 3) of the present invention.
Figure 16:
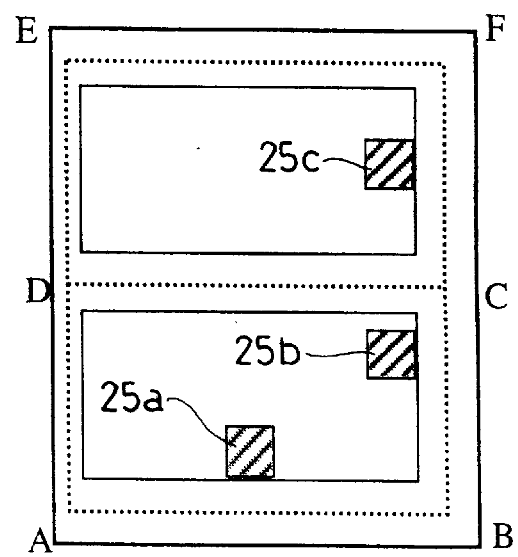
FIG. 16 is a view useful in explaining a result of display of all image pickup positions according to this embodiment.
Figure 17:
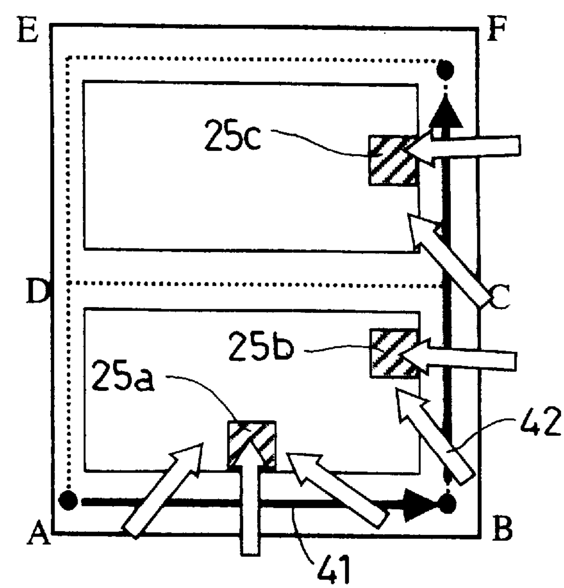
FIG. 17 is a view useful in explaining a result of indication of an observation path.

FIGS. 15 to 17 show (Embodiment 3).

FIG. 15 shows an omnidirectional video apparatus according to (Embodiment 3).

(Embodiment 3) is the same as (Embodiment 2) except that the image pickup position display means 4 of the terminal device 13 is replaced with a map data storage means 37 and a synthesizing position display means 38.

The map data storage means 37 according to (Embodiment 3) has map data for an area photographed by the omnidirectional image pickup means 1, previously written thereto. The synthesizing position display means 38 is connected to the omnidirectional image position storage means 3 of the supply center 12 via the bidirectional communication means 10 to display the photographing positions stored in the omnidirectional image position storage means 3 as in (Embodiment 1) and (Embodiment 2), while synthesizing and displaying the map information stored in the map data storage means 37, on the same screen.

FIG. 16 shows a display format for the synthesizing position display means 38. As also shown in FIG. 5, reference numerals 25*a*, 25*b*, and 25*c* denote the positions of the buildings on the path. In this manner, not only the traveling path is displayed but also the map information such as the locations of buildings are added and displayed based on the map data.

FIG. 17 shows an observation path and a line-of-sight direction indicated by the view point vector indicating means 33. The arrows 41 in FIG. 17 denote the observation path, and the thick white arrows 42 denote the line-of-sight directions. If, for example, the user desires to observe the buildings 25*a*, 25*b*, and 25*c*, since their positions have been confirmed in advance, the user selects an observation path passing through the points A, B, C, and F and indicates the line-of-sight directions toward the buildings 25*a*, 25*b*, and 25*c*.

According to (Embodiment 3), the positions where the omnidirectional images were photographed and the map information are synthesized and displayed to enable the user to recognize environments of the photographing positions beforehand to accurately indicate an observation path and a line-of-sight direction depending on the user's tastes.

In this embodiment, the map data storage means 37 is provided inside the terminal device 13, but similar effects are clearly obtained by providing it inside the supply center 12 or invoking the map data storage means 37 installed in another device (not shown) connected to the bidirectional communication device.

Embodiment 4

Figure 19:
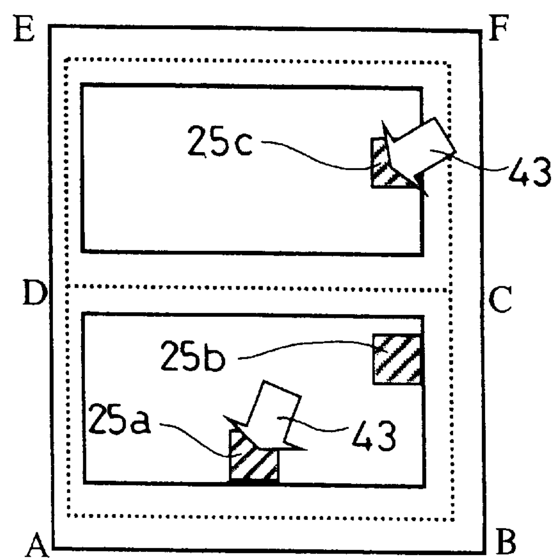
FIG. 19 is a view useful in explaining a result of indication of an object according to this embodiment.
Figure 20:
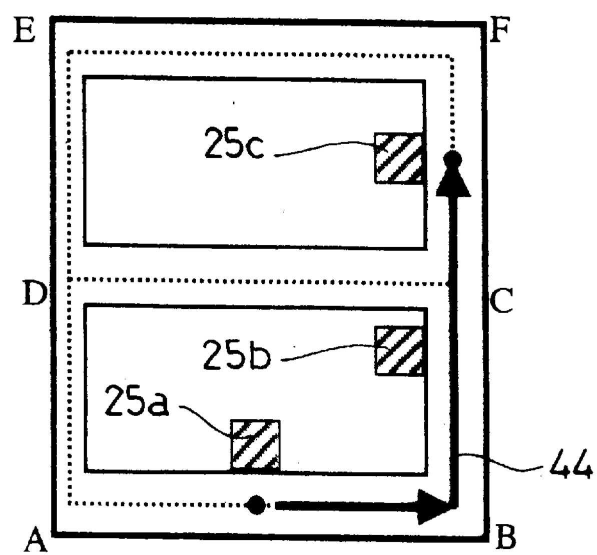
FIG. 20 is a view useful in explaining a result of computation for an observation path according this embodiment.
Figure 21:
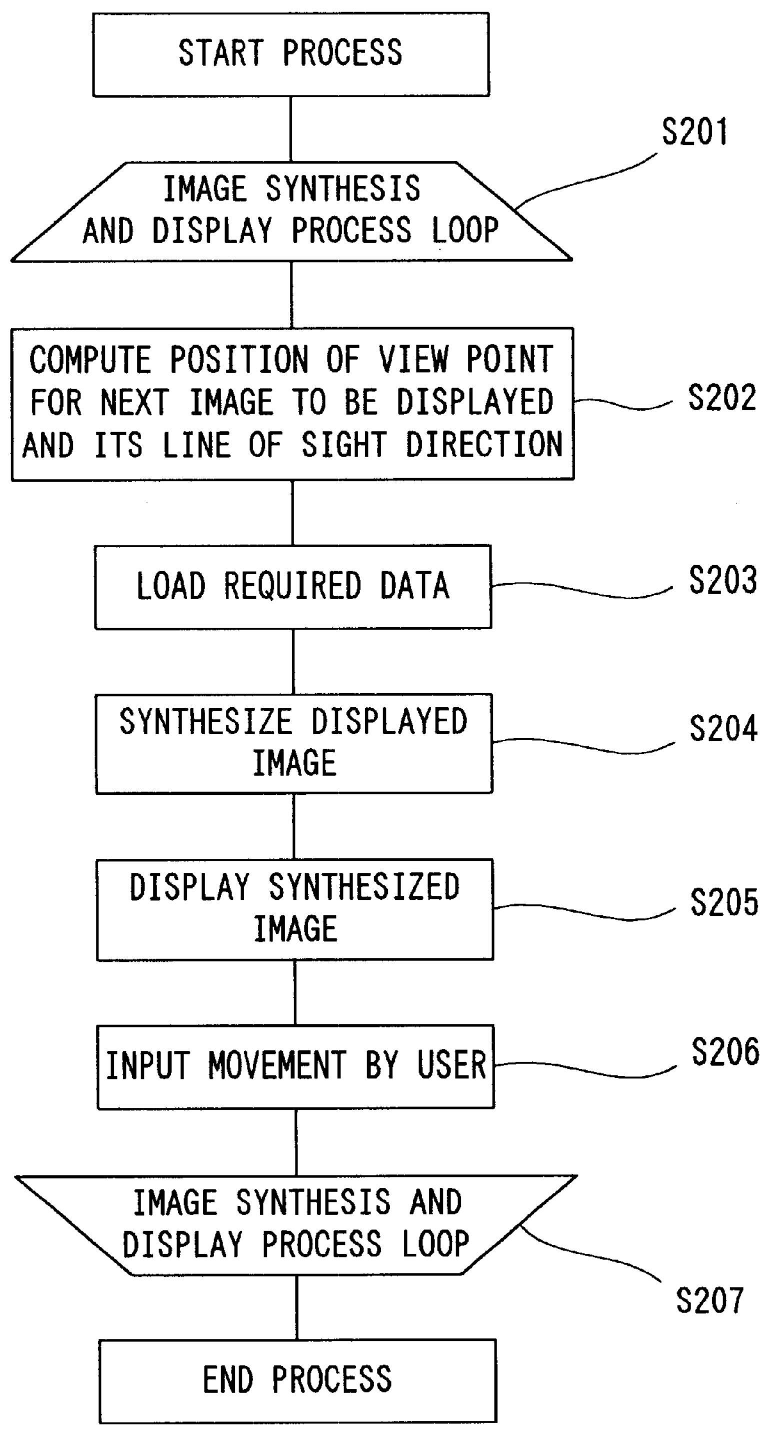
FIG. 21 is a block diagram showing an operational procedure executed by a conventional apparatus.

FIGS. 18 to 20 shows (Embodiment 4).

(Embodiment 4) is the same as (Embodiment 1) except that the map data storage means 37 and the synthesizing position display means 38 replace the image pickup position display means 4 according to (Embodiment 1) shown in FIG. 1 and that an object specifying means 39 and a view point position computing means 40 replace the view point position indicating means 5. The map data storage means 37 and the synthesizing position display means 38 are the same as those in (Embodiment 3).

The object specifying means 39 is an input device for specifying only a desired object of the objects on all the image pickup paths displayed by the synthesizing position display means 38.

A view point position computing means 40 computes an optimal path from the position of the object specified by the object specifying means 39.

(Step 4-1)

On receiving positional information and record numbers from the omnidirectional image position storage means 3 via the bidirectional communication means 10, the synthesizing position display means 38 invokes from the map data storage means 37 map data for an area photographed by the omnidirectional image pickup means 1, and synthesizes and displays them.

A path diagram displayed by the synthesizing position display means 38 and having the additional map data is similar to that in FIG. 16. As also shown in FIG. 5, reference numerals 25*a*, 25*b*, and 25*c* denote the positions of the buildings on the path. In this manner, not only the traveling path is displayed but also the map information such as the locations of buildings are added and displayed based on the map data.

(Step 4-2-(1))

On checking all the photographing positions displayed on the synthesizing position display means 38 at (Step 4-1), the user uses the object specifying means 39 to specify only a desired object on the path of the photographing positions displayed on the synthesizing position display means 38.

FIG. 19 shows a result of specification of a plurality of objects by means of the object specifying means 39. The thick white arrows denote the specified objects; in FIG. 19, the buildings 25*a* and 25*c* have been specified.

(Step 4-2-(2))

The view point position computing means 40 in FIG. 18 automatically computes a path for observing the specified buildings 25*a* and 25*c* as shown in FIG. 19.

FIG. 20 shows a result of display of the result of the computation of the observation path. The path is shown by an arrow 44. To compute the path, for example, all paths joining the buildings 25*a* and 25*c* in FIG. 19 together and the shortest of them is determined as the observation path. A different method may be used to compute the path as long as it can compute a path between a plurality of objects.

Since the observation path has been established at (Step 4-2-(2)), the subsequent steps are similar to (Step 1-3) to (Step 1-6) in (Embodiment 1).

According to (Embodiment 4), the positions where the omnidirectional images 24 were photographed and the map information are synthesized and displayed to enable the user to recognize environments of the photographing positions beforehand to accurately indicate an observation path depending on the user's tastes. In addition, the path can be automatically created simply by specifying the user's desired place, so that images of the user's desired place can be simply reproduced without the need to input the view point position.

In this embodiment, the observation path is automatically computed while the line-of-sight direction is indicated by the user, but the direction of the object relative to the observation path can be easily estimated from this path. Thus, the view point position computing means 40 can be used to mathematically obtain the observation path and the line-of-sight direction. In that case, the process will be similar to (Step 2-3) and (Step 2-7) in (Embodiment 2).

Specifically, the terminal device 13 has an computation means for computing an optimal observation path joining each view point with the position of the object specified by the object specifying means 39 to output view point information and estimating the direction of the object relative to the observation path to output line-of-sight information. The supply center 12 has the image extracting and converting means 34 for invoking required image data from the omnidirectional image position storage means 3 to convert them into expanded images based on the view point information and line-of-sight information indicated by the computation means via the bidirectional communication means 10, and processing the expanded images 27 depending on the line-of-sight information. The terminal device 13 has the image display means 9 for displaying as an image a signal received from the image extracting and converting means 34 via the bidirectional communication means 10.

What is claimed is:

1. An omnidirectional video output method, comprising:

photographing, at a viewpoint position moving within a service area, images around said viewpoint position and storing image position data describing positions where the images were photographed, and recording the images as an omnidirectional image position file so that the images correspond to said image position data;

presenting to a user the image position data on positions where omnidirectional images were recorded;

reading image data from said omnidirectional image position file based on information about a viewpoint in such service area, the information being specified by a user; and processing each read image data based on a line-of-sight direction specified by a user and outputting an output image.

2. An omnidirectional video output method, comprising:

providing a terminal device for communicating with a supply center and receiving image data from said supply center to output images;

transmitting to said terminal device image position data from a supply center having an omnidirectional image position file comprising images photographed at each viewpoint position in all directions by moving within a service area as well as data about image positions at which the images were photographed, the image position data containing data about positions where the images in all directions were photographed;

transmitting information about a desired viewpoint from the transmitted image position data to the supply center;

reading by the supply center image data from an omnidirectional image position file to convert said read image data into expanded images and transmitting the expanded images to the terminal device, based on the viewpoint information specified by the terminal device; and processing by the terminal device the received expanded images depending on a desired line-of-sight direction to output images.

3. An omnidirectional video output method, comprising:

providing a terminal device for communicating with a supply center receiving required image data from said supply center to output images;

transmitting to said terminal device image position data from a supply center having an omnidirectional image position file comprising images photographed at each viewpoint position in all directions by moving within a service area as well as data about image positions at which the images were photographed, the image position data containing data about positions where the images in all directions were photographed;

transmitting information about a desired viewpoint and a desired line of sight from the transmitted image position data to the supply center;

reading by the supply center image data from an omnidirectional image position file to process said read image data based on said line-of-sight information specified by the terminal device and on the viewpoint information, to convert said read image data into window images and transmitting the window images to the terminal device; and outputting output images by the terminal device.

4. The omnidirectional video output method according to claim 3, further comprising synthesizing and displaying a map of the service area and said image position data, when the image position data about positions where omnidirectional images were recorded are presented from the supply center to the terminal device.

5. The omnidirectional video output method according to claim 2, wherein when the image position data about positions where omnidirectional images were recorded are transmitted from the supply center to the terminal device, the method further comprises:

synthesizing and displaying by the terminal device a map of the service area and said image position data;

computing by the terminal device an optimal path joining each viewpoint with a position of a specified one of objects on all displayed image paths;

based on a result of the computation, reading by the supply center image data from the omnidirectional image position file to convert said read image data into the expanded images and transmitting the expanded images to the terminal device; and processing by the terminal device the received expanded images, depending on the desired line-of-sight direction, for outputting output images when receiving the expanded images at the desired view point position.

6. The omnidirectional video output method according to claim 2, wherein when the image position data about positions where omnidirectional images were recorded are transmitted from the supply center to the terminal device, the method further comprises:

synthesizing and displaying by the terminal device a map of the service area and said image position data;

computing by the terminal device an optimal path joining each viewpoint with a position of a specified one of objects on all displayed image paths, as well as the line-of-sight direction of the object relative to an observation path, and transmitting the optimal path and the line-of-sight direction to the supply center;

reading by the supply center image data from the omnidirectional image position file to process said read image data based on said line-of-sight information of the result of the computation to convert them into window images and transmitting the window images to the terminal device, based on the observation path of a result of the computation; and outputting output images by the terminal device.

7. An omnidirectional video output apparatus comprising:

a supply center and terminal device, the terminal device for communicating with the supply center and receiving image data from said supply center to output images, wherein:

the supply center comprises omnidirectional image position storage means having an omnidirectional image position file for storing images photographed at each viewpoint position in all directions, the viewpoint position moving within a service area, and for storing data about image positions at which the images were photographed, the image position data comprising data about positions where the images were photographed;

the apparatus comprises bidirectional communication means for transmitting and receiving information between the supply center and the terminal device;

the terminal device comprises image position display means for displaying image position data about positions where omnidirectional images were photographed, the data being read out from said omnidirectional image position storage means via said bidirectional communication means;

the terminal device comprises viewpoint position indicating means for outputting information about a desired viewpoint on a traveling path based on a display by said image position display means;

the supply center comprises image converting means for reading image data from the omnidirectional image position storage means for converting the read data into expanded images based on the viewpoint information indicated by said viewpoint position indicating means via said bidirectional communication means; and the terminal device comprises image processing means for processing the expanded images received from the image converting means via said bidirectional communication means, depending on a desired line-of-sight direction, and image display means for displaying window images output by the image processing means.

8. An omnidirectional vide output apparatus comprising:

a supply center and a terminal device, the terminal device for communicating with the supply center and receiving image data from said supply center to output images, wherein:

the supply center comprises omnidirectional image position storage means having an omnidirectional image position file for storing images photographed at each viewpoint position in all directions, the viewpoint position moving within a service area, and for storing data about image positions at which the images were photographed, the image position data comprising data about positions where the images were photographed;

the apparatus comprises bidirectional communication means for transmitting and receiving information between the supply center and the terminal device;

the terminal device comprises image position display means for displaying image position data about positions where omnidirectional images were photographed, the data being read out from said omnidirectional image position storage means via said bidirectional communication means;

the terminal device comprises line-of-sight vector indicating means for outputting information about a desired viewpoint and a desired line of sight on a traveling path based on a display by said image position display means;

the supply center comprises image extracting and converting means for reading image data from the omnidirectional image position storage means based on the viewpoint information received from said line-of-sight vector indicating means via said bidirectional communication means and processing and outputting the read image data based on the line-of-sight information received from said line-of-sight vector indicating means; and the terminal device comprises image display means for displaying as an image a signal received from the supply center via the bidirectional communication means.

9. An omnidirectional vide output apparatus comprising:

a supply center and a terminal device, the terminal device for communicating with the supply center and receiving image data from said supply center to output images, wherein:

the supply center comprises omnidirectional image position storage means having an omnidirectional image position file for storing images photographed at each viewpoint position in all directions, the viewpoint position moving within a service area, and for storing data about image positions at which the images were photographed, the image position data comprising data about positions where the images were photographed;

the apparatus comprises bidirectional communication means for transmitting and receiving information between the supply center and the terminal device;

the terminal device comprises map data storage means for storing a map of a service area registered therein;

the terminal device comprises synthesizing position display means for displaying a map read out from said map data storage means and the image position data on about the positions where omnidirectional images were photographed, the data having been read out from said omnidirectional image positions storage means via said bidirectional communication means, so that the map and the image position data overlap each other;

the terminal device comprises line-of-sight vector indicating means for outputting information about a desired viewpoint and a desired line of sight on a traveling path based on a display by said synthesizing position display means;

the supply center comprises image extracting and converting means for reading image data from the omnidirectional image position storage means based on the viewpoint information received from said line-of-sight vector indicating means via said bidirectional communication means and processing and converting the read image data into window images based on the line-of-sight information received from said line-of-sight vector indicating means; and the terminal device comprises image display means for displaying the window images received from the supply center via the bidirectional communication means.

10. An omnidirectional video output apparatus comprising:

a supply center and a terminal device, the terminal device for communicating with the supply center and receiving image data from said supply center to output images, wherein:

the supply center comprises omnidirectional image position storage means having an omnidirectional image position file for storing images photographed at each viewpoint position in all directions, the viewpoint position moving within a service area, and for storing data about image positions at which the images were photographed, the image position data comprising data about positions where the images were photographed;

the apparatus comprises bidirectional communication means for transmitting and receiving information between the supply center and the terminal device;

the terminal device comprises map data storage means for storing a map of the service area registered therein;

the terminal device comprises synthesizing position display means for displaying a map read out from said map data storage means and image position data about the positions where omnidirectional images were photographed, the image position data having been read out from said omnidirectional image positions storage means via said bidirectional communication means, so that the map and the image position data overlap each other;

the terminal device comprises object specifying means for specifying one of objects on all image paths displayed on the synthesizing position display means;

the terminal device comprises viewpoint position computing means for computing an optimal path joining each viewpoint with a position of an object specified by said object specifying means;

the supply center comprises image converting means for reading image data from the omnidirectional image position storage means based on the viewpoint information indicated by said viewpoint position computing means via said bidirectional communication means and for converting the data into expanded images; and the terminal device comprises image processing means for processing expanded images received from the image converting means via said bidirectional communication means, depending on a desired line-of-sight direction, and image display means for displaying window images output by the image processing means.

11. An omnidirectional video output apparatus comprising:

a supply center and a terminal device, the terminal device for communicating with a supply center and receiving image data from said supply center to output images, wherein:

the supply center comprises omnidirectional image position storage means having an omnidirectional image position file for storing images photographed at each viewpoint position in all directions, the viewpoint position moving within a service area, and for storing data on image positions at which the images were photographed, the image position data containing data on positions where the images were photographed;

the apparatus comprises bidirectional communication means for transmitting and receiving information between the supply center and the terminal device;

the terminal device comprises map data storage means for storing a map of the service area registered therein;

the terminal device comprises synthesizing position display means for displaying a map read out from said map data storage means and image position data about the positions where omnidirectional images were photographed, the image position data having been read out from said omnidirectional image positions storage means via said bidirectional communication means, so that the map and the image position data overlap each other;

the terminal device comprises object specifying means for specifying one of objects on all image paths displayed on the synthesizing position display means;

the terminal device comprises computation means for computing an optimal path joining each viewpoint with a position of an object specified by said object specifying means, to output viewpoint information, and estimating a direction of an object relative to said observation path to output line-of-sight information;

the supply center comprises image converting means for reading image data from the omnidirectional image position storage means based on viewpoint information and line-of-sight information indicated by said computation means via said bidirectional communication means, converting the read image data into expanded images, and processing the expanded images depending on said line-of-sight information; and the terminal device comprises image display means for displaying as an image a signal received from the image converting means via said bidirectional communication means.

* * * * *